United States Patent
Kato

(10) Patent No.: US 10,839,538 B2
(45) Date of Patent: Nov. 17, 2020

(54) IMAGE PROCESSING SYSTEM

(71) Applicant: OMRON Corporation, Kyoto (JP)

(72) Inventor: Yutaka Kato, Kyotanabe (JP)

(73) Assignee: OMRON Corporation, Kyoto (JP)

( * ) Notice: Subject to any disclaimer, the term of this patent is extended or adjusted under 35 U.S.C. 154(b) by 104 days.

(21) Appl. No.: 16/162,410

(22) Filed: Oct. 17, 2018

(65) Prior Publication Data
US 2019/0213748 A1 Jul. 11, 2019

(30) Foreign Application Priority Data

Jan. 10, 2018 (JP) .................................. 2018-002091

(51) Int. Cl.
| | | |
|---|---|---|
| *G06T 7/586* | (2017.01) | |
| *G01N 21/956* | (2006.01) | |
| *G01B 11/25* | (2006.01) | |
| *H04N 5/225* | (2006.01) | |
| *G03B 17/54* | (2006.01) | |
| *G03B 15/03* | (2006.01) | |

(52) U.S. Cl.
CPC .......... *G06T 7/586* (2017.01); *G01B 11/2513* (2013.01); *G01N 21/95684* (2013.01); *G03B 15/03* (2013.01); *G03B 17/54* (2013.01); *H04N 5/2256* (2013.01); *G03B 2215/0564* (2013.01)

(58) Field of Classification Search
None
See application file for complete search history.

(56) References Cited

U.S. PATENT DOCUMENTS

| | | |
|---|---|---|
| 2007/0058164 A1 | 3/2007 | Shibata et al. |
| 2008/0297779 A1 | 12/2008 | Taniguchi et al. |
| 2014/0014848 A1 | 1/2014 | Hatakeyama et al. |
| 2015/0355102 A1 | 12/2015 | Kido |
| 2018/0365821 A1* | 12/2018 | Uemura ................ G06T 7/0004 |
| 2019/0132524 A1* | 5/2019 | Hashiguchi ........... G06T 7/0008 |

FOREIGN PATENT DOCUMENTS

JP         2007206797         8/2007

OTHER PUBLICATIONS

"Search Report of Europe Counterpart Application", dated Nov. 30, 2018, p. 1-p. 7.

* cited by examiner

*Primary Examiner* — Dov Popovici
(74) *Attorney, Agent, or Firm* — JCIPRNET

(57) ABSTRACT

An image processing system avoids at its best restrictions in determining applicable facilities. The image processing system includes a camera for photographing a workpiece, an illumination device having light transmittance and disposed between the camera and the workpiece, and a control device for controlling the camera and the illumination device. The illumination device can change illumination patterns according to instructions from the control device. The control device controls the camera so that photographs are taken under each illumination pattern.

8 Claims, 14 Drawing Sheets

IMAGE PROCESSING SYSTEM

CROSS-REFERENCE TO RELATED APPLICATION

This application claims the priority benefit of Japan application serial no. 2018-002091, filed on Jan. 10, 2018. The entirety of the above-mentioned patent application is hereby incorporated by reference herein and made a part of this specification.

BACKGROUND

Technical Field

The disclosure relates to an image processing system.

Description of Related Art

In fields such as Factory Automation (FA), an image processing technology has been put to use for photographing an object (hereinafter also referred to as a "workpiece") under illumination by light from an illumination device and obtaining information of the object from the generated image data.

For example, Japanese Laid-open No. 2007-206797 (Patent Document 1) has disclosed an image processing device in which a plurality of light sources are installed with their optical axes with respect to an object oriented diagonally downward, and each time the image processing device illuminates the object with each light source, the image processing device photographs the object with a camera disposed right above the object and inspects the appearance of the object using a plurality of photographed images obtained by photographing the object.

Technical Problem

In the above-described conventional device, while the camera is disposed right above the object, it is necessary to arrange the plurality of light sources at positions different from one another in the periphery of the camera in order to put the optical axes at different angles with respect to the object. The device as a whole is inevitably large in size. For this reason, there is a concern that the device faces restriction in determining applicable facilities.

SUMMARY

The disclosure provides an image processing system that avoids at its best restrictions in determining applicable facilities.

An embodiment of the disclosure provides an image processing system which uses image data obtained by photographing an object to perform image measurement of the object. The image processing system includes a photographing part for photographing an object, a light emitting part with light transmittance, and a control part for controlling the photographing part and the light emitting part, wherein the light emitting part is disposed between the photographing part and the object and has a light emitting surface widening in a direction different from an optical axis directed from the photographing part to the object. The control part causes light of a first illumination pattern to be emitted from the light emitting part to the object and obtains first image data by causing the photographing part to photograph the object, and causes light of a second illumination pattern different from the first illumination pattern to be emitted from the light emitting part to the object and obtains second image data by causing the photographing part to photograph the object.

DESCRIPTION OF THE EMBODIMENTS

Solution to the Problem

Figure 1:
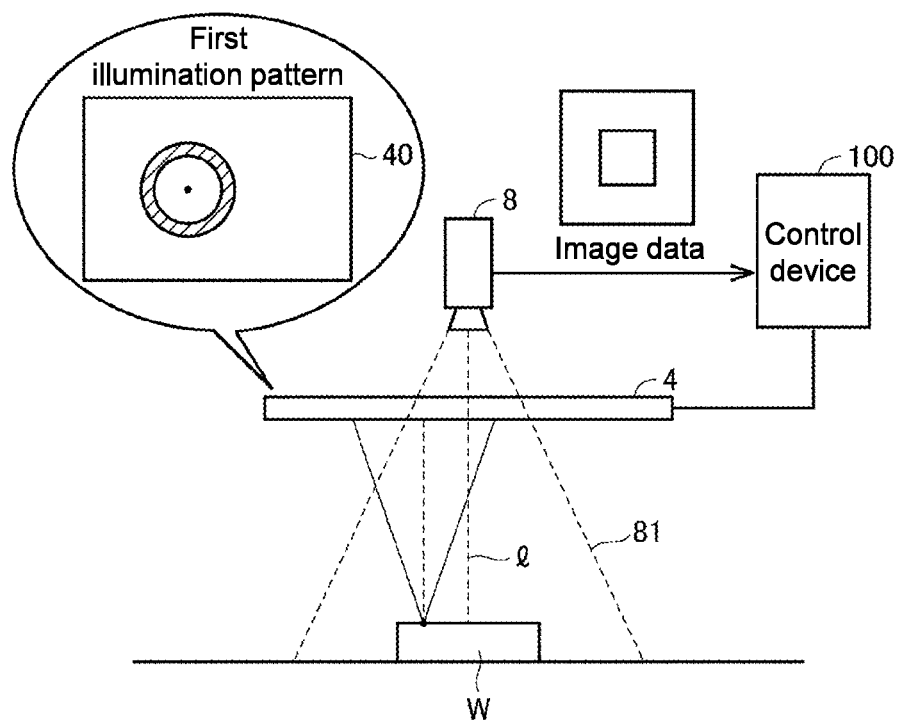
FIG. 1 is a diagram schematically showing an application scene of an image processing system according to the present embodiment.
Figure 1:
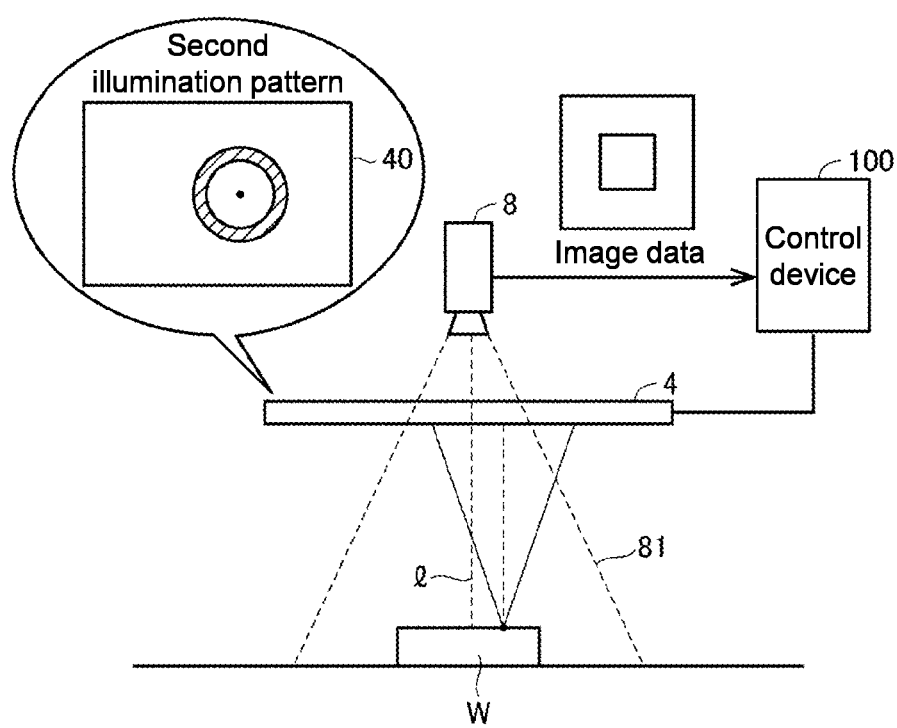

An embodiment of the disclosure provides an image processing system which uses image data obtained by photographing an object to perform image measurement of the object. The image processing system includes a photographing part for photographing an object, a light emitting part with light transmittance, and a control part for controlling the photographing part and the light emitting part, wherein the light emitting part is disposed between the photographing part and the object and has a light emitting surface widening in a direction different from an optical axis directed from the photographing part to the object. The control part causes light of a first illumination pattern to be emitted from the light emitting part to the object and obtains first image data by causing the photographing part to photograph the object, and causes light of a second illumination pattern different from the first illumination pattern to be emitted from the light emitting part to the object and obtains second image data by causing the photographing part to photograph the object.

According to the disclosure, since the light emitting part is disposed between the photographing part and the object, compared with the case where the light emitting part is not disposed between the photographing part and the object, the entire image processing system can have a compact size. As a result, restrictions in determining applicable facilities can be avoided as much as possible.

In the above disclosure, the control part may use a plurality pieces of image data including at least the first image data and the second image data to perform an image measurement process with respect to the object. The first image data may be associated with a first target position in a photography visual field of the photographing part. The second image data may be associated with a second target position in the photography visual field. The first illumination pattern may be determined according to the first target position. The second illumination pattern may be determined according to the second target position.

According to the disclosure, since the illumination patterns are determined for each of the target positions within the photography visual field, illumination environments corresponding to the target positions can be provided. As a result, the accuracy of image measurement can be improved.

In the above disclosure, the first illumination pattern and the second illumination pattern may be determined so that an incident direction of light emitted from the light emitting part to the first target position is substantially the same as an incident direction of light emitted from the light emitting part to the second target position.

According to the disclosure, since the incident direction of light emitted to each target position within the photography visual field is substantially the same for each target position, the illumination environments for each target position can be made substantially the same.

In the above disclosure, the control part may sequentially change illumination patterns of light emitted from the light emitting part to the object and cause the photographing part to sequentially photograph the object corresponding to sequential changes of the illumination patterns.

According to the disclosure, image data photographed under different illumination patterns can be obtained sequentially, and image measurement can be performed based on a plurality pieces of sequentially obtained image data.

In the above disclosure, the photographing part may include a readout circuit that reads out the image signal from a part of a plurality of light receiving elements which convert light included in the photography visual field into an image signal. The control part may expose at least a first light receiving element corresponding to the first target position among the plurality of light receiving elements included in the photographing part when the light of the first illumination pattern is emitted from the light emitting part and subsequently read out an image signal from at least the first light receiving element among the plurality of light receiving elements. In addition, the control part may expose at least a second light receiving element corresponding to the second target position among the plurality of light receiving elements when the light of the second illumination pattern is emitted from the light emitting part and subsequently read out an image signal from at least the second light receiving element among the plurality of light receiving elements.

According to the disclosure, since it is possible to read out the image signal from the light receiving element corresponding to the illuminated target position, the time required for reading out the image signal can be shortened compared with the case of reading out image signals from all of the light receiving elements.

In the above disclosure, at least a part of a process of reading out the signal of the first light receiving element and at least a part of a process of exposing the second light receiving element when the light of the second illumination pattern is emitted from the light emitting part may be performed at the same time.

According to the disclosure, since a part of the process of reading out the signal and a part of the process of exposing the light receiving element can be performed at the same time, the time required for obtaining the image data used for image processing can be shortened.

In the above disclosure, the first image data may include one pixel corresponding to the first target position and one or a plurality of pixels adjacent to the one pixel. The second image data may include one pixel corresponding to the second target position and one or a plurality of pixels adjacent to the one pixel.

According to the disclosure, the number of times of photographing required for obtaining an image of the entire photography visual field can be reduced.

In the above disclosure, at least a part of pixels among the plurality of pixels included in the first image data and the plurality of pixels included in the second image data may be common. The control part may output an image measurement result at a position of the photographing part corresponding to the common pixels based on the first image data and the second image data.

According to the disclosure, since the control part outputs the image measurement result at the position of the photographing part corresponding to the common pixels based on the first image data and the second image data, the accuracy of image measurement for a region located between the first target position and the second target position can be improved.

In the above disclosure, when an illumination pattern corresponding to each target position is emitted, the control part may change colors of emitted light according to a distance from a reference position corresponding to the target position on the light emitting surface of the light emitting part.

According to the disclosure, the three-dimensional shape of a surface of the object including the target positions can be detected as hue information corresponding to the wavelength of the emitted light.

In the above disclosure, illumination conditions which include the illumination patterns may be determined according to types of objects. The image processing system may further comprise a storage part for storing the plurality of illumination conditions set according to the types of the objects; and a setting part which, according to input of information about the types of the objects, sets the illumination conditions corresponding to the types of the objects.

According to the disclosure, a highly versatile image processing system which can be used irrespective of the type of the object can be provided.

[Effects]

The disclosure can provide an image processing system which avoids at its best restrictions in determining applicable facilities.

§ 1 Application Example

First, an example of a scene in which the disclosure is applied will be described with reference to FIG. 1. FIG. 1 is a diagram schematically showing an application scene of an image processing system 1 according to the present embodiment.

The image processing system 1 performs image measurement of a workpiece W (i.e., an object) using image data obtained by photographing the workpiece W. The image processing system 1 includes a camera 8 (an example of the photographing part), an illumination device 4 (an example of the light emitting part), and a control device 100 (an example of the control part) which controls the camera 8 and the illumination device 4.

The illumination device 4 is disposed between the camera 8 and the workpiece W and has a light emitting surface 40 widening in a direction different from an optical axis Q directed from the camera 8 to the workpiece W. Light is emitted onto the workpiece W from the light emitting surface 40. In addition, the illumination device 4 has light transmittance. The illumination device 4 has light transmittance to the extent that the camera 8 can photograph the workpiece W through the illumination device 4. For the illumination device 4, an existing illumination such as organic electroluminescence (hereinafter referred to as an organic EL) illumination, LED illumination or the like may be used.

An illumination pattern is a gradation pattern of light emitted onto the workpiece W from the illumination device 4, and in the present embodiment, it refers to a distribution pattern of luminous intensity of the light emitting surface 40. In addition, the "luminous intensity," as an example of the degree of light emission and the intensity of light, includes, for example, luminance ($cd/m^2$), candela (cd), and the like.

The illumination device 4 may change the illumination pattern accordance with an instruction from the control device 100. The control device 100 controls the camera 8 so as to take photographs under each illumination pattern. That is, the control device 100 causes the illumination device 4 to emit light of a first illumination pattern to the workpiece W and obtains first image data by causing the camera 8 to photograph the workpiece W when the first illumination pattern is illuminated. In addition, the control device 100 causes the illumination device 4 to emit light of a second illumination pattern to the workpiece W and obtains second image data by causing the camera 8 to photograph the workpiece W when the second illumination pattern is illuminated.

In this way, since the illumination device 4 has light transmittance, the camera 8, the workpiece W and the illumination device 4 can be disposed coaxially, and disposition positions of the camera 8 and the illumination device 4 can be selected freely. In particular, compared with an image processing system which does not allow a coaxial disposition, the image processing system 1 according to the present embodiment may allow each device to be disposed in a relatively free way. In this way, the entire image processing system can be made compact. Furthermore, since the camera 8 may be disposed irrespective of the position of the illumination device 4, a highly versatile image processing system in terms of freedom of disposition can be provided. As a result, restrictions in determining applicable facilities can be avoided as much as possible.

Furthermore, the control device 100 may control the illumination patterns of the light emitted from the illumination device 4 and may obtain image data by taking photographs under each illumination pattern. Therefore, the illumination patterns may be changed according to the shape of a local surface of the workpiece W. Among the surfaces constituting the workpiece W, there are surfaces parallel to the light emitting surface 40 and surfaces not parallel to the light emitting surface 40; for example, when light is emitted with a common illumination pattern onto both surfaces parallel and non-parallel to the light emitting surface 40, incident angles of light onto the parallel surfaces are different from incident angles of light onto the non-parallel surfaces, which causes illumination conditions for each surface to be different. In the present embodiment, since the illumination patterns may be changed, the same illumination condition can be set for each local surface of the surfaces constituting the workpiece W. As a result, measurement accuracy can be improved.

Furthermore, since the control device 100 can control the illumination patterns of the light emitted from the illumination device 4 and obtain the image data by taking photographs under each illumination pattern, a highly versatile image processing system applicable to any workpiece can be provided. For example, for an illumination device unable to change illumination patterns, it is necessary to change patterns of emitted light by adjusting illumination positions whenever the types of the workpieces placed on a production line are changed. On the other hand, the image processing system according to the present embodiment can change the illumination patterns by the control device. In addition, since image data can be obtained by taking photographs under each illumination pattern, when the types of workpieces are changed, it is only necessary to change the illumination pattern and not necessary to adjust, for example, the position of the illumination device 4.

§ 2 Specific Example

Figure 2:
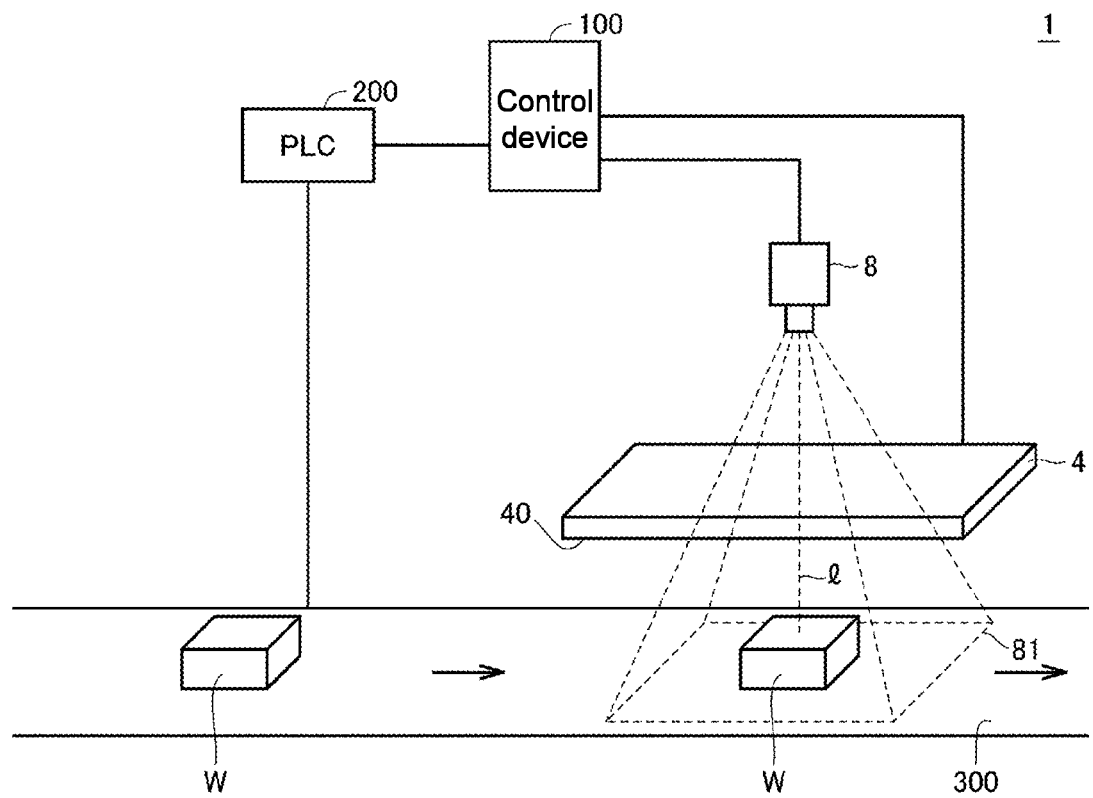
FIG. 2 is a schematic diagram showing an example of a production line to which the image processing system according to the present embodiment is applied.

A. An Example of a Production Line to which the Image Processing System is Applied An example of the image processing system according to the present embodiment is described below. First, with reference to FIG. 2, the following describes an example of a method of performing appearance inspection of workpieces W which are transported on a production line by applying an image processing system 1, which is an example of the image processing system. FIG. 2 is a schematic diagram showing an example of a production line to which the image processing system 1 according to the present embodiment is applied.

As shown in FIG. 2, the image processing system 1 according to the present embodiment includes a camera 8 for photographing workpieces W continuously transported in, an illumination device 4 for illuminating the workpieces W, and a control device 100 for controlling the illumination device 4 and the camera 8. The camera 8 includes an optical system, such as a lens and an aperture, and a photoelectric converter, such as a CMOS (Complementary Metal Oxide Semiconductor) image sensor 82 (with reference to FIG. 8) as main components. The photoelectric converter is a device that converts light included in a photography visual field 81 of the camera 8 into an image signal.

The illumination device 4 emits illumination light onto the workpiece W placed on a stage 300. The illumination device 4 has a light emitting surface 40 widening light in a direction different from an optical axis Q directed from the camera 8 to the workpiece W. The illumination light emitted from the light emitting surface 40 may be changed as desired in accordance with an illumination pattern instructed by the control device 100. The illumination device 4 has light transmittance and is typically a transparent organic EL illumination. The illumination device 4 has light transmittance to the extent that when the camera 8 is disposed above and the workpiece W is disposed below with the disposition position of the illumination device 4 as a reference, the camera 8 can photograph objects placed below the illumination device 4 through the illumination device 4.

The workpiece W to be inspected is moved to an inspection position where the camera 8 and the illumination device 4 are fixed by the movable stage 300. The stage 300 is controlled by a PLC (Programmable Logic Controller) 200. When the workpiece W is transported to the inspection position, the PLC 200 controls the stage 300 so that the workpiece W stops on the spot until the appearance inspection performed by the image processing system 1 is completed. At this time, the control device 100 photographs the workpiece W with the camera 8 while illuminating the workpiece W with light from the illumination device 4. The control device 100 controls the illumination device 4 so as to change the illumination pattern of the light emitted from the illumination device 4 and controls the camera 8 so as to photograph the workpiece W with the camera 8 each time the illumination pattern of light is changed. The control device 100 inspects the appearance of the workpiece W using a plurality of photographed images obtained in this way. Furthermore, when the appearance inspection is completed, the control device 100 outputs an inspection result to the PLC 200. The PLC 200 transports the next workpiece W to the inspection position based on the output of the inspection result from the control device 100.

B. An Example of the Hardware Configuration of the Control Device

Figure 3:
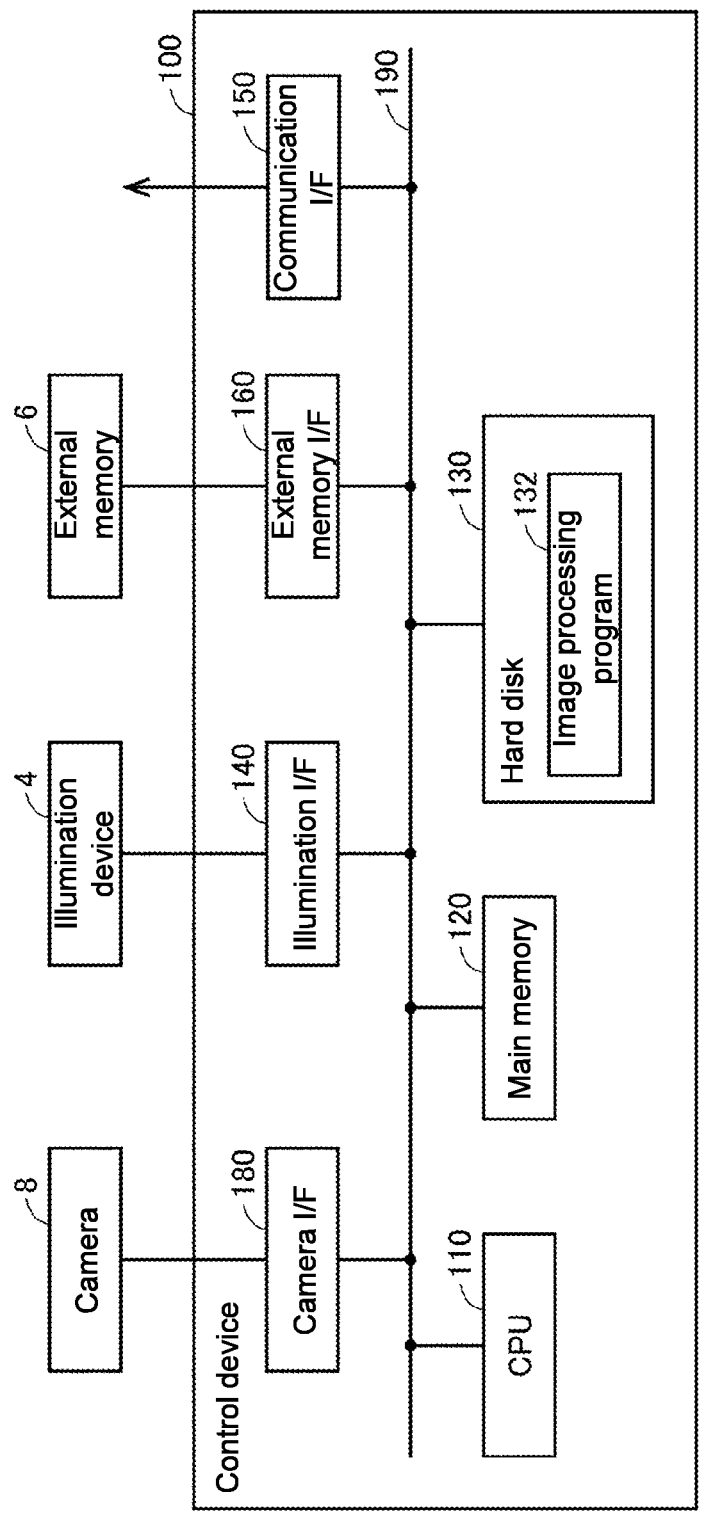
FIG. 3 is a schematic diagram showing a hardware configuration of a control device.

FIG. 3 is a schematic diagram showing a hardware configuration of the control device 100. The control device 100 includes a CPU (Central Processing Unit) 110, a main memory 120, a hard disk 130, a camera interface (I/F) 180, an illumination I/F 140, a communication I/F 150 and an external memory I/F 160. These parts are connected via a bus 190 so that they can communicate data with one another.

The CPU 110 develops programs (codes) including an image processing program 132 installed in the hard disk 130 in the main memory 120 and executes them in a predetermined order to perform various calculations. The main memory 120 is typically a volatile storage device such as a DRAM (Dynamic Random Access Memory).

Being an internal memory included in the control device 100 and a non-volatile storage device, the hard disk 130 includes the image processing program 132. In addition to the hard disk 130, or in place of the hard disk 130, a semiconductor storage device such as a flash memory may be adopted.

The camera I/F 180 mediates data transmission between the CPU 110 and the camera 8. In other words, the camera I/F 180 is connected to the camera 8 which generates image data. In addition, following an internal command from the CPU 110, the camera I/F 180 gives a command for controlling a photographing operation in the connected camera 8.

The illumination I/F 140 mediates data transmission between the CPU 110 and the illumination device 4. In other words, the illumination I/F 140 is connected to the illumination device 4. In addition, following an internal command from the CPU 110, the illumination I/F 140 transmits an instruction on the illumination pattern to the connected illumination device 4. The illumination device 4 emits light of the illumination pattern based on the received instruction. Furthermore, the illumination device 4 may be connected to the control device 100 via the camera 8. The camera 8 may be connected to the control device 100 via the illumination device 4.

The communication I/F 150 exchanges various data between the PLC 200 and the CPU 110. Furthermore, the communication I/F 150 may exchange data between a server and the CPU 110. The communication I/F 150 includes hardware corresponding to a network for exchanging various data with the PLC 200.

The external memory I/F 160 is connected to the external memory 6 and performs processes of reading data from and/or writing data into the external memory 6. The external memory 6 is attachable to and detachable from the control device 100 and is typically a non-volatile storage device such as a USB (Universal Serial Bus) memory or a memory card. In addition, various programs such as the image processing program 132 are not necessarily stored in the hard disk 130 and may be stored in a server that can communicate with the control device 100 or in the external memory 6 that can be directly connected to the control device 100. For example, various programs are distributed in a state where the various programs to be executed by the control device 100 and various parameters to be used in the various programs are saved in the external memory 6, the external memory I/F 160 reads out the various programs and the various parameters from the external memory 6. Alternatively, programs and parameters downloaded from a server or the like that is communicably connected to the control device 100 may be installed in the control device 100.

The image processing program 132 according to the present embodiment may be provided as being incorporated in a part of another program. In addition, alternatively, a part or all of the functions provided by the execution of the image processing program 132 may be installed as a dedicated hardware circuit.

C. A Structure of the Illumination Device 4

Figure 4:
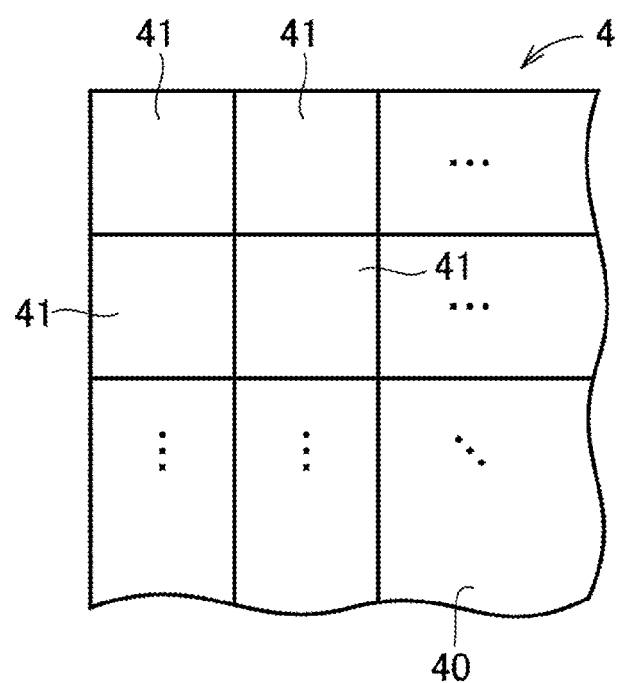
FIG. 4 is a partially enlarged schematic diagram of an illumination device according to the present embodiment.

FIG. 4 is a partially enlarged schematic diagram of the illumination device 4 according to the present embodiment. The illumination device 4 includes a plurality of illumination elements 41 disposed in a matrix layout. The illumination device 4 may light each illumination element 41 independently. The illumination pattern in the present embodiment refers to an illumination pattern determined by a lit-up illumination element 41 among the plurality of illumination elements 41. Furthermore, in the illumination device 4 that can change the wavelength of light emitted from each illumination element 41, the illumination pattern is determined by the lit-up illumination element 41 among the plurality of illumination elements 41 and the wavelength of the light emitted from each lit-up illumination element 41. In the present embodiment, a gradation pattern of the light emitting surface 40 is referred to as an illumination pattern.

Each illumination element 41 includes, for example, a light emitting region and a transparent region and is configured to be able to emit light in its entirety by causing the light-emitting region to emit light. Furthermore, with the transparent region, each illumination element 41 retains light transmittance.

D. An Example of Illumination Patterns Emitted from the Illumination Device 4

Figure 5:
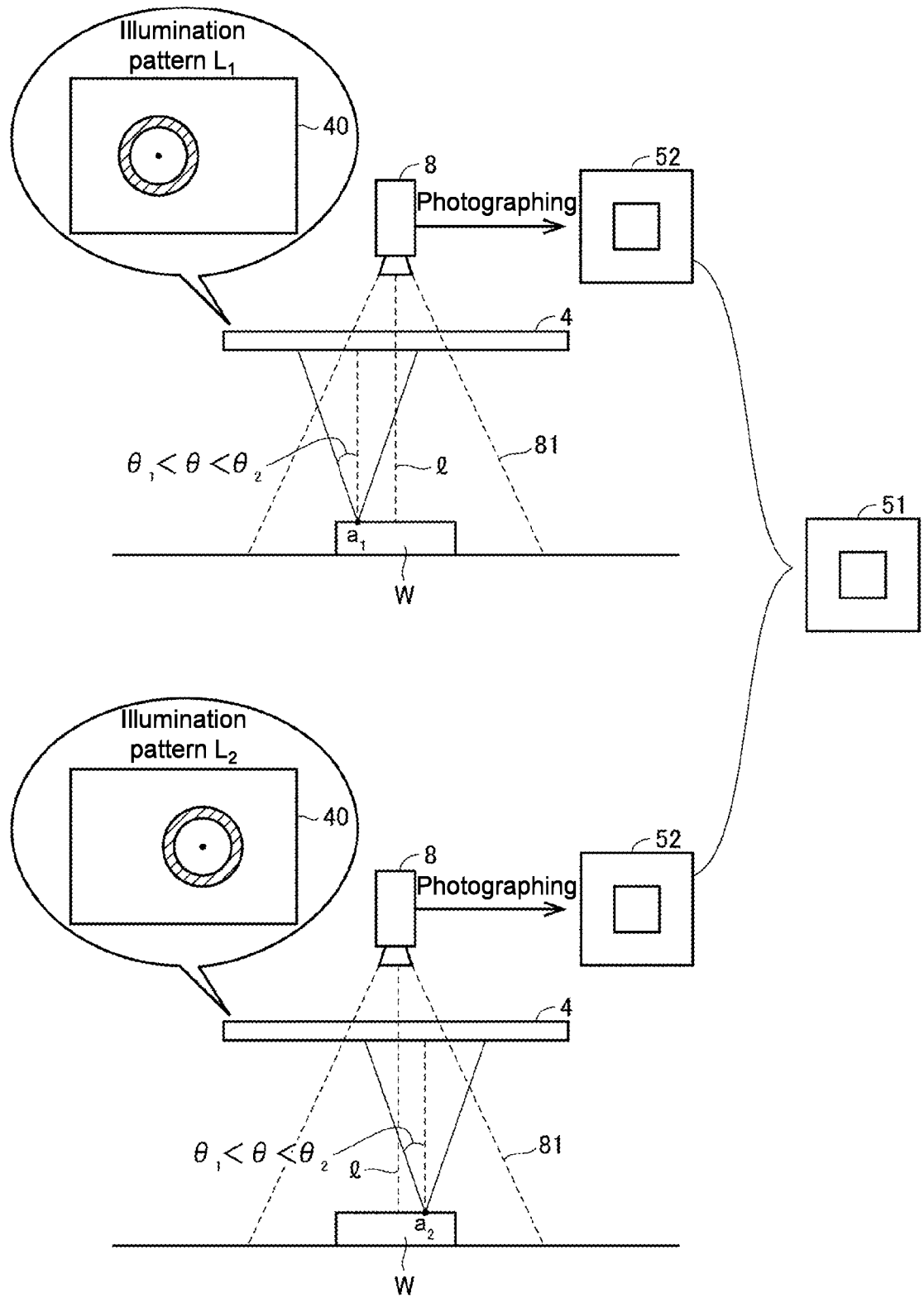
FIG. 5 is a diagram illustrating an example of illumination patterns formed by an illumination device.

FIG. 5 is a diagram illustrating an example of illumination patterns formed by the illumination device 4. The control device 100 controls the illumination device 4 so that the illumination patterns of light emitted from the illumination device 4 are changed sequentially and controls the camera 8 so as to photograph the workpiece W under each illumination pattern. The control device 100 performs appearance inspection of the workpiece W based on a plurality pieces of image data photographed under each of the plurality of illumination patterns.

The illumination patterns L are set for each target position a in the photography visual field 81 of the camera 8. Inspection image data 51 used for the appearance inspection is generated from a plurality pieces of image data 52 obtained by taking photographs under each illumination pattern L, respectively. Image data of a position a' corresponding to the target positions a in the inspection image data 51 is generated from the image data 52 obtained by taking photographs under the illumination patterns L set in association with the target positions a.

The illumination patterns L are determined so that the incident angles θ of light incident on the target positions a are substantially the same on any target position a. For example, when an illumination pattern $L_1$ is set so that the incident angle of light incident on a small plane including the target position at is in a range of θ1 to θ2, an illumination pattern $L_2$ is set so that the incident angle of light incident on a small plane including the target position $a_2$ is in a range of θ1 to θ2.

E. An Example of a Method of Generating the Inspection Image Data 51

Figure 6:
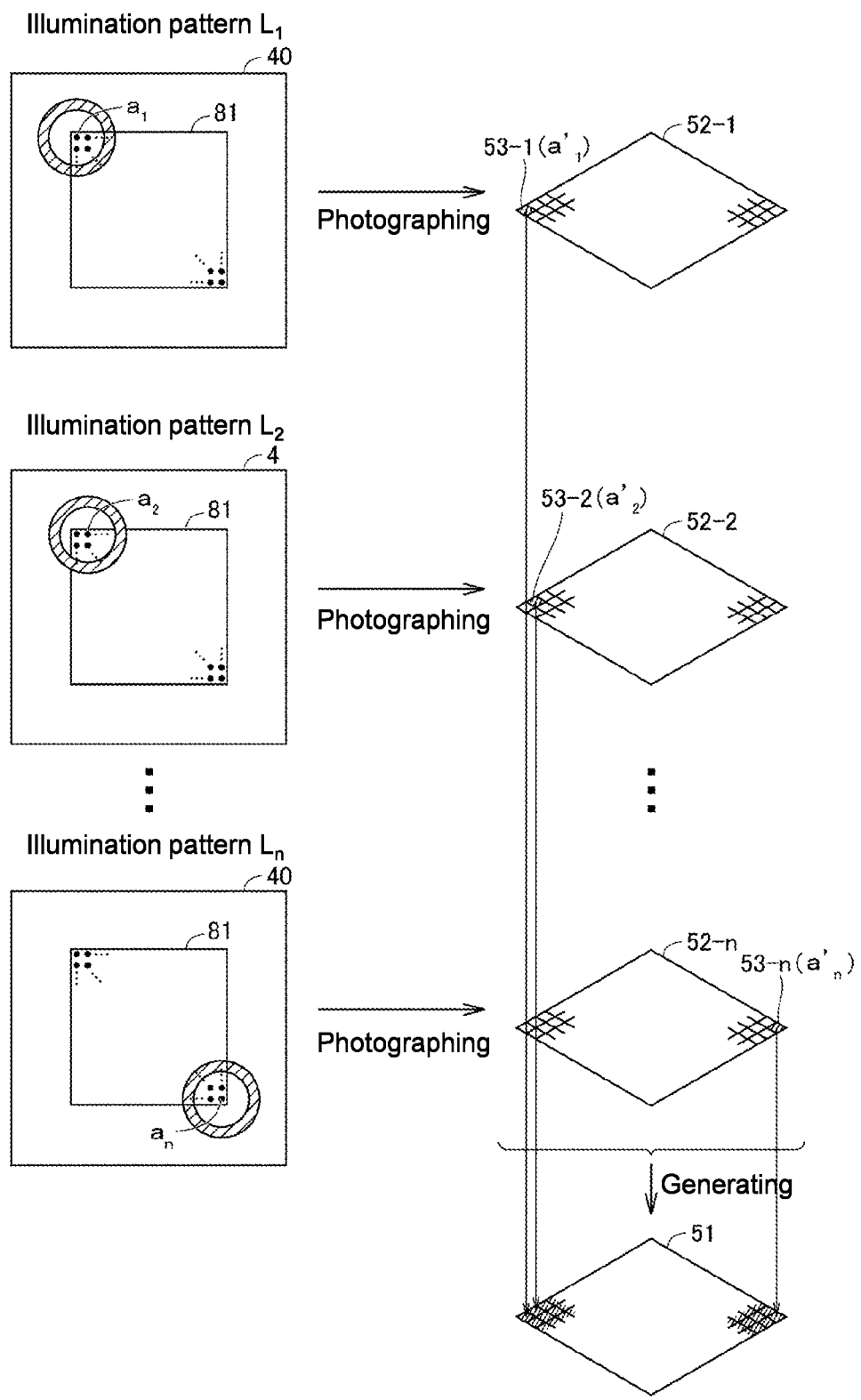
FIG. 6 is a diagram illustrating an example of a method of generating inspection image data.

FIG. 6 is a diagram illustrating an example of a method of generating the inspection image data 51. In the example of FIG. 6, the target position $a_1$ to the target position $a_n$ are set as the target positions a in the photography visual field 81. The illumination patterns L are set for each target position a. The control device 100 obtains image data 52-1 to 52-$n$ photographed under each of the illumination patterns $L_1$ to $L_n$.

The control device 100 generates the inspection image data 51 from the plurality pieces of obtained image data 52-1 to 52-$n$. Based on partial image data 53-1 including a position $a'_1$ corresponding to the target position at within the image data 52-1, the control device 100 generates image data of the position $a'_1$ corresponding to the target position $a_1$ within the inspection image data 51. Similarly, the control device 100 generates image data of a position $a'_2$ corresponding to the target position $a_2$ within the inspection image data 51 based on partial image data 53-2 and generates image data of position $a'_n$ corresponding to the target position $a_n$ within the inspection image data 51 based on partial image data 53-$n$.

In other words, the inspection image data 51 is generated from the partial image data 53-1 to 53-$n$. The partial image data 53 may include one pixel or a plurality of pixels. The range of the partial image data 53 is set according to the distance between the target position a and a target position adjacent to the target position a and is set to generate a piece of inspection image data 51 from the partial image data 53-1 to the partial image data 53-$n$.

Here, when the partial image data 53 includes a plurality of pixels, it is possible to reduce the number of times of photographing and the number of times of changing the illumination patterns. In addition, the range of the partial image data 53 may be set so that a plurality pieces of partial image data 53 overlap one another. In this case, pixel information of the overlapping part is generated based on the partial image data 53.

Among the illumination patterns $L_1$ to $L_n$, one illumination pattern is an example of a "first illumination pattern," and another illumination pattern is an example of a "second illumination pattern." In addition, among the image data 52-1 to 52-$n$ and the partial image data 53-1 to 53-$n$, a piece of image data or partial image data is an example of "first image data," and another piece of image data or partial image data is an example of "second image data." Among the target positions $a_1$ to $a_n$, one target position is an example of a "first target position," and another target position is an example of a "second target position."

In this way, the illumination patterns are determined for each target position, and the inspection image data 51 used for image measurement is generated using a plurality pieces of image data photographed under each illumination pattern. In other words, the image measurement is performed using a plurality pieces of image data photographed under each illumination pattern. Therefore, the image data photographed under the illumination environment corresponding to the target position can be used, and the accuracy of the image measurement can be improved.

Further, in determining the illumination patterns, when the illumination pattern $L_1$ is set so that the range of the incident angle of light incident on a small plane including the target position $a_1$ is θ1 to θ2, the illumination pattern $L_2$ is set so that that the range of the incident angle of light incident on a small plane including the target position $a_2$ is θ1 to θ2. As a result, the illumination environments can be substantially the same for each target position.

In addition, in the present embodiment, the control device 100 does not obtain from the camera 8 the image signal for generating the image data 52 which indicates the entire photography visual field 81 but may obtain from the camera 8 only the image signal for generating the partial image data 53. In other words, the control device 100 may obtain only the partial image data 53-1 to 53-$n$ photographed under the respective illumination patterns $L_1$ to $L_n$. A function for the control device 100 to read out only the partial image data 53-1 to 53-$n$ from the camera 8 is described below.

F. A Partial Readout Function

Figure 7:
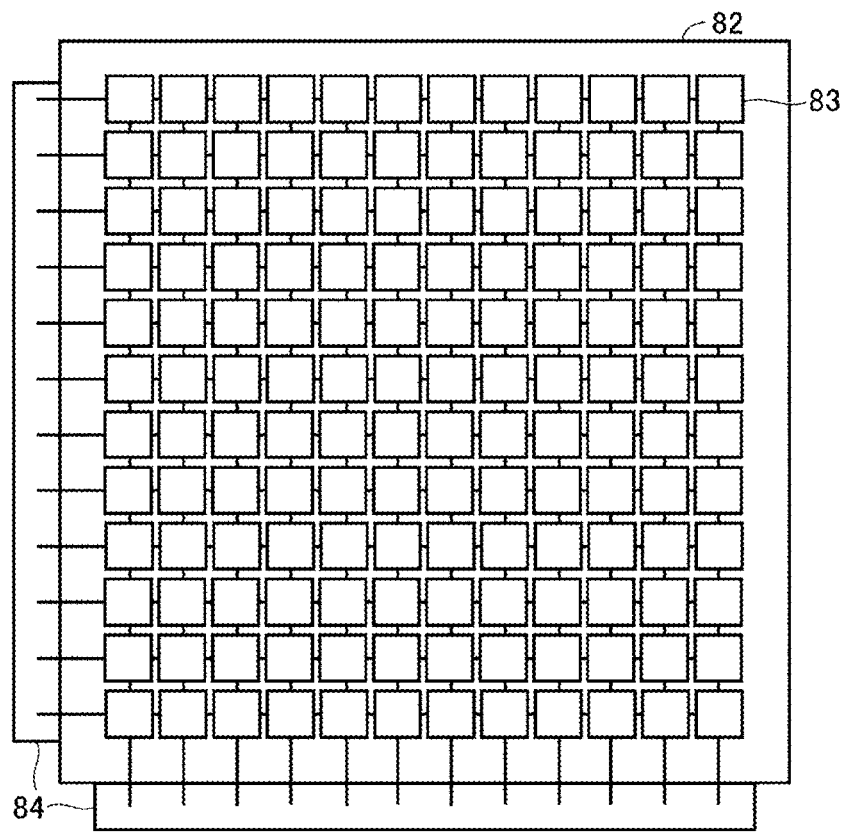
FIG. 7 is a schematic diagram showing a CMOS image sensor.

A partial readout function for the control device 100 to read out only image signals corresponding to specific image data from the camera 8 is described. FIG. 7 is a schematic diagram showing a CMOS image sensor 82. The camera 8 includes the CMOS image sensor 82 that may adopt a partial readout method and a readout circuit 84 that reads out partial areas of the CMOS image sensor 82. The CMOS image sensor 82 includes a plurality of photodiodes 83. A partial area of the CMOS image sensor 82 includes one or a plurality of photodiodes 83. In addition, reading out the partial areas of the CMOS image sensor 82 specifically means reading out the image signal from one or a plurality of photodiodes 83 included in the partial areas. The photodiode is an example of a "light receiving element," and the light receiving element may be any element that has a function of converting light energy into electric charge and is not limited to a photodiode.

The control device 100 causes all of the photodiodes 83 to receive light when light is emitted. Thereafter, in order to obtain the partial image data 53 corresponding to the illumination pattern of the emitted light, the image signal is read out from the photodiode 83 corresponding to the partial image data. With the partial readout function, compared with the case of reading out image signals from all the photodiodes 83, the time required for readout can be shortened.

Although the camera 8 including the CMOS image sensor 82 is taken as an example of the camera 8 having the partial readout function, the camera 8 may include other types of image sensors such as a CCD image sensor if the readout circuit 84 is included.

G. A Switching Timing of the Illumination Patterns L and a Readout Timing of the Image Signals When the camera 8 can start the next exposure while reading out the image signal, the control device 100 may perform at least a part of the process of reading out the image signal from the specific photodiode 83 and at least a part of the process of causing the photodiode 83 to receive light at the same time. As a result, exposure can be performed while the readout process is being performed, so the time required for obtaining the image signals from all of the photodiodes 83 can be shortened.

Figure 8:
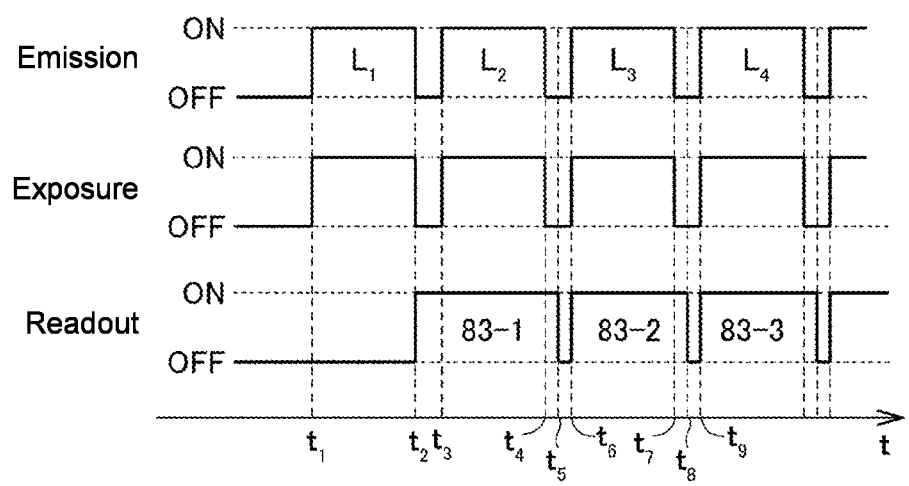
FIG. 8 is a timing chart showing timings of reading out image signals from photodiodes.

Specifically, the exposure performed while the readout process is performed is described below with reference to FIG. 8. FIG. 8 is a timing chart showing timings of reading out the image signals from the photodiodes 83. An image signal for generating the partial image data 53-1 is read out from the photodiode 83-1 in FIG. 8, and an image signal for generating the partial image data 53-2 is read out from the photodiode 83-2. In addition, the partial image data 53-1 corresponds to the illumination pattern $L_1$ and to the partial image data 53-2. The control device 100 switches the illumination patterns L in the order of the illumination patterns $L_1$, $L_2$ to $L_n$.

A plurality of lines shown in FIG. 8 include, from the top to the bottom of the page, lines indicating the illumination patterns of light emitted from the illumination device 4, lines indicating whether or not exposures are performed, and lines indicating whether or not image signals are being read out. The "exposures are performed" means that the photodiodes 83 receive light and accumulate electric charges.

The control device 100 illuminates the photodiodes 83 with light in the state where the light of the illumination pattern $L_1$ is emitted, and at a timing $t_2$ when a predetermined exposure time has elapsed from a timing $t_1$ when the exposure is started, the control device 100 starts the process of reading out the image signal from the photodiode 83-1. Next, the illumination pattern $L_1$ is switched to the illumination pattern $L_2$, and light is emitted to the photodiodes 83, and at a timing $t_5$ when a predetermined exposure time has elapsed from a timing $t_3$ when the exposure is started, the process of reading out the image signal from the photodiode 83-2 is started.

In the case of using the camera 8 that has a CMOS image sensor or a CCD image sensor which does not have a function of starting the exposure during readout of the image signal, the exposure may be started after the readout process is completed. Specifically, the exposure is started at the timing $t_3$ when the process of reading out the image signal from the photodiode 83-1 is completed.

In the case of using the camera 8 that has an image sensor capable of causing electric charges to accumulate only in a part of the photodiodes 83, electric charges may be accumulated in the photodiodes 83 corresponding to the pattern of the light being emitted, and the image signals may be read out from all the photodiodes 83 at a timing when electric charges are accumulated in all the photodiodes 83. Further, after electric charges are accumulated in the photodiodes 83 corresponding to the pattern of the light being emitted, the process of reading out the image signals from the photodiodes 83, the process of switching to the next illumination pattern, and the process of accumulating electric charges in the photodiodes 83 corresponding to the next illumination pattern may be performed.

H. A Method of Determining the Illumination Patterns

As described above, the illumination patterns L are determined so that the incident angles θ of the light incident on the target positions a are substantially the same on any target position a. In addition, the camera 8 in the present embodiment employs a telecentric lens. For ease of description, the workpiece W has a rectangular parallelepiped shape, and the light emitting surface 40 of the illumination device 4 is orthogonal to the optical axis of the camera 8.

Figure 9:
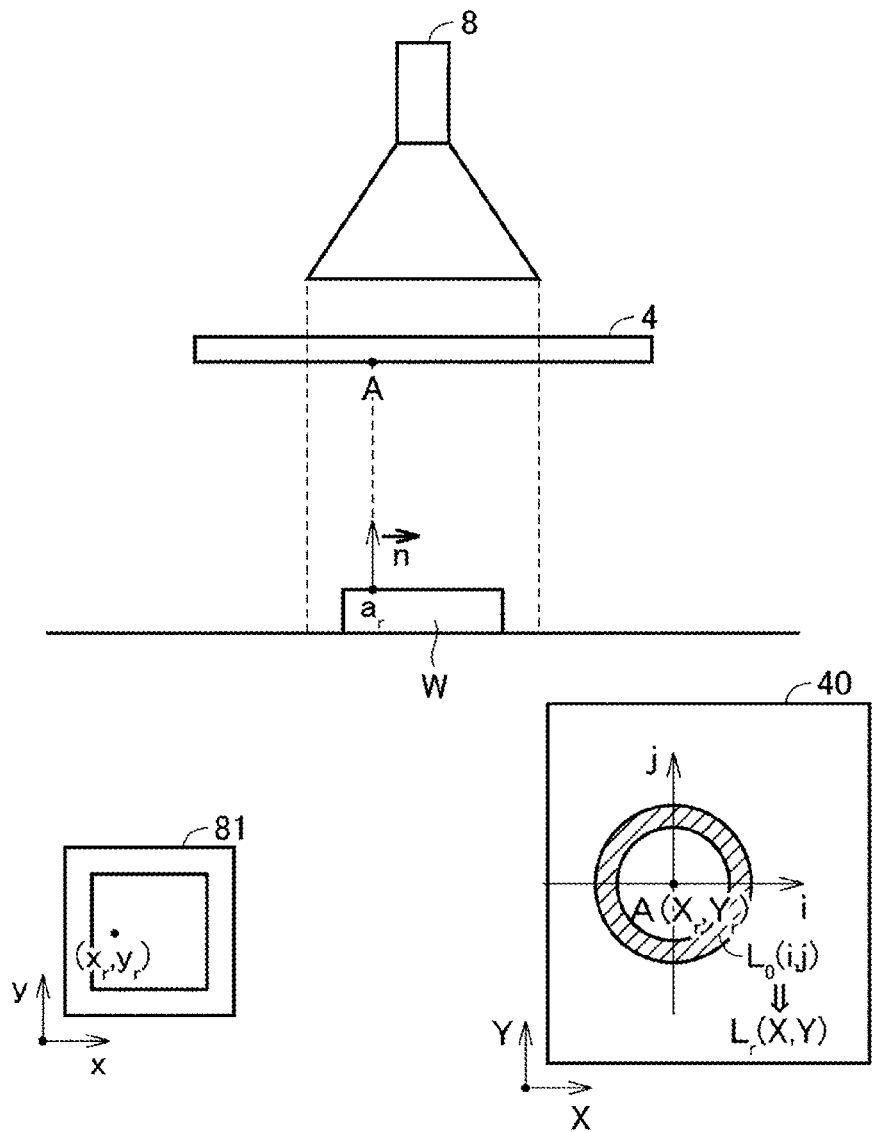
FIG. 9 is a schematic diagram for illustrating a method of determining illumination patterns for each target position.

FIG. 9 is a schematic diagram for illustrating a method of determining the illumination patterns for each target position. In order to make the range of the incident angles θ of the light incident on the target positions a substantially the same on any target position a, in the present embodiment, the illumination patterns L are determined such that the illumination pattern $L_0$ centered on the perpendicular line n of a small plane including the target positions a is common for each target position a.

The control device 100 determines the illumination pattern $L_r$ corresponding to the target position $a_r$. The target position $a_r$ is defined in a camera coordinate system (x, y) that defines the photography visual field 81 of the camera 8, and the position of the target position $a_r$ in the camera coordinate system is $(x_r, y_r)$.

The intersection A of the perpendicular line $n_r$ of a small plane including the target position $a_r$ and the light emitting surface 40 is defined in an illumination coordinate system (X, Y) that defines the illumination pattern, and the position of the intersection A in the illumination coordinate system is $(X_r, Y_r)$.

The position of the target position $a_r$ in the camera coordinate system is $(x_r, y_r)$, and the position of the intersection A in the illumination coordinate system is $(X_r, Y_r)$, and between the two positions, for example, the relation of Equation (1) holds. Therefore, positions in the camera coordinate system may be converted to positions in the illumination coordinate system.

[Equation 1]

$$\begin{pmatrix} X_r \\ Y_r \end{pmatrix} = A \begin{pmatrix} x_r \\ y_r \end{pmatrix} + B \quad (1)$$

The coefficients A and B are calibration parameters and are obtained by calculation based on the positional relationship between the camera 8 and the illumination device 4 after the positions of the camera 8 and the illumination device 4 are fixed or may be obtained by performing a calibration operation. When the light emitting surface 40 of the illumination device 4 is not orthogonal to the optical axis Q of the camera 8, a known method such as perspective transformation may be used instead of the Equation (1).

The illumination pattern $L_r$ is determined so that the illumination pattern $L_0$ is formed with $(X_r, Y_r)$ as the center. Specifically, when a function indicating the shape of the reference illumination pattern $L_0$ which serves as the reference is defined as $L_0(i, j)$, the illumination pattern $L_r$ can be expressed as Equation (2).

[Equation 2]

$$L_r(X-X_r, Y-Y_r) = L_0(i,j) \quad (2)$$

Therefore, the illumination pattern $L_r$ at the target position $a_r$ can be obtained from the Equations (1) and (2). The camera coordinate system $(x_r, y_r)$ is in correspondence with the plurality of photodiodes 83 included in the CMOS image sensor 82. In order to obtain the image signal for generating the partial image data 53-$r$ including the camera coordinate system $(x_r, y_r)$, the control device 100 controls the illumination device 4 so as to emit light of the illumination pattern $L_r$ and controls the camera 8 so as to expose the photodiode 83-$r$. At this time, the control device 100 can specify the illumination pattern $L_r$ to be instructed to the illumination device 4 based on the camera coordinate system $(x_r, y_r)$ and the reference illumination pattern $L_0$.

Although a telecentric lens is adopted above, the camera 8 may use an optical system other than a telecentric lens. In this case, the line of sight of the camera and the optical axis $\ell$ of the camera 8 are not parallel to each other, so it is preferable to set the calibration parameters by performing calibration described below.

I. A Functional Configuration of the Control Device 100

Figure 10:
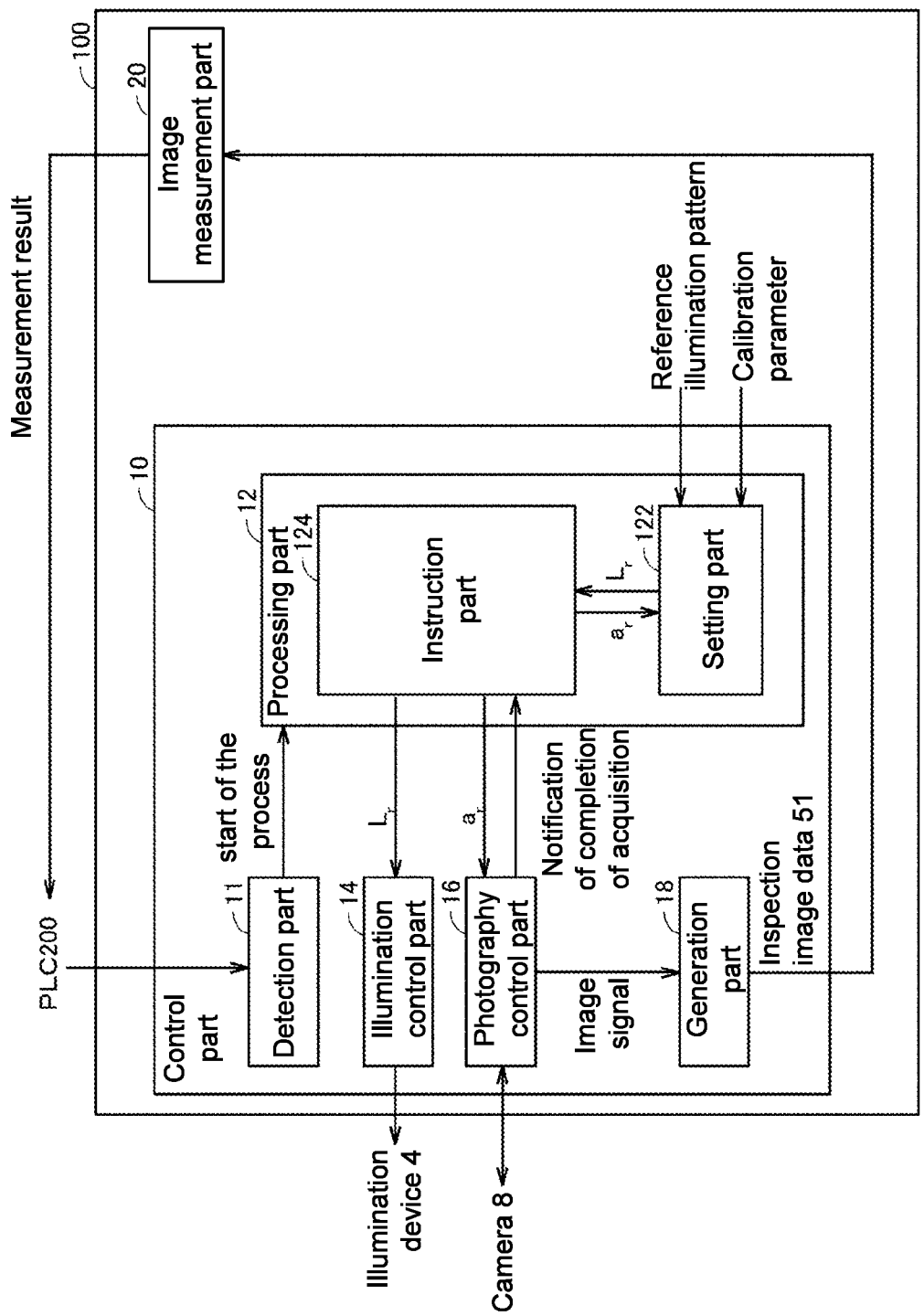
FIG. 10 is a diagram showing an example of a functional configuration of a control device.

FIG. 10 is a diagram showing an example of a functional configuration of the control device 100. The control device 100 includes a control part 10 and an image measurement part 20. The CPU 110 develops the image processing program 132 in the main memory 120 and executes the image processing program 132, thereby fulfilling functions as the control part 10 and the image measurement part 20.

The control part 10 controls the camera 8 and the illumination device 4 in order to obtain the inspection image data 51. The image measurement part 20 performs predetermined image measurement based on the inspection image data 51 obtained by the control part 10, and outputs a measurement result to the PLC 200. The output destination of the measurement result is not necessarily the PLC 200 but may be, for example, a portable terminal, a printer, or the like communicably connected to the control device 100.

The control part 10 includes a detection part 11, a processing part 12, an illumination control part 14, a photography control part 16, and a generation part 18. The detection part 11 detects that a signal indicating the workpiece W has been transported to a predetermined inspection position has been notified from the PLC 200. Based on the detection of the signal from the PLC 200, the detection part 11 notifies the processing part 12 to start the process for obtaining the inspection image data 51.

The processing part 12 includes a setting part 122 for setting the illumination pattern $L_r$ for each target position and an instruction part 124 that sends to the photography control part 16 information that can specify the target position $a_r$ and sends to the illumination control part 14 information that can specify the illumination pattern $L_r$ corresponding to the target position $a_r$.

The photography control part 16 sets the photodiodes 83 corresponding to the target position $a_r$ into an exposure state based on the information about the target position $a_r$ sent from the instruction part 124 and notifies the instruction part 124 that an image signal has been obtained based on the elapse of a predetermined exposure time. In addition, the photography control part 16, after putting the photodiodes 83 corresponding to the target position $a_r$ into the exposure state, continues to set a readout state, reads out the image signal, and transmits it to the generation part 18.

The illumination control part 14 controls the illumination device 4 so as to emit the light in the illumination pattern $L_r$ sent from the instruction part 124.

The instruction part 124 notifies the setting part 122 of the information that can specify the next target position $a_r$ based on the notification from the photography control part 16 that the image signal has been obtained. The setting part 122 sets the illumination pattern $L_r$ corresponding to the target position $a_r$ as notified and notifies the instruction part 124. Here, the setting part 122 sets the illumination pattern $L_r$ based on the reference illumination pattern $L_0$ set in advance and the calibration parameters. In other words, the setting part 122 sets the illumination pattern $L_r$ so that the incident angles of light incident on each target position become substantially the same.

The instruction part 124 sends to the photography control part 16 information that can specify the target position $a_r$ and sends to the illumination control part 14 information that can specify the illumination pattern $L_r$ corresponding to the target position $a_r$. The instruction part 124 continues the process until there is no target position $a_r$ at which the obtainment of the image signal has not been completed. That is, the instruction part 124 sequentially changes the illumination pattern $L_r$ and causes the camera 8 to sequentially photograph the workpiece W in accordance with the sequential change.

The generation part 18 generates the inspection image data 51 based on the image signal sent from the photography control part 16 and sends the generated inspection image data 51 to the image measurement part 20.

Here, when a plurality pieces of partial image data 53 overlap with one another, that is, when a part of the pixels included in the partial image data 53-1 and a part of the pixels included in the partial image data 53-2 are common, the generation part 18 generates pixel information of the common part based on the partial image data 53-1 and the partial image data 53-2 to generate the inspection image data 51. Since the inspection image data 51 is image data used for image measurement, it can be said that the image measurement of the common part is performed based on the partial image data 53-1 and the partial image data 53-2.

In this way, when the plurality pieces of partial image data 53 overlap with one another, by generating the pixel information of the overlapping part based on the plurality pieces of partial image data 53, it is possible to ensure the continuity between the adjacent partial image data 53. In addition, in this way, gaps formed between the partial image data 53 and the adjacent partial image data 53 can be reduced, and erroneous measurement due to such gaps can be prevented.

J. A Calibration Method

An example of a calibration method for obtaining the correspondence relationship between the camera coordinate system (x, y) and the illumination coordinate system (X, Y) will be described. In other words, the correspondence relationship between the camera coordinate system (x, y) and the illumination coordinate system (X, Y) can be said to be the correspondence relationship between the photodiodes 83 and the illumination elements 41.

The control device 100 controls the illumination device 4 so as to sequentially light up the illumination elements 41 one by one and controls the camera 8 so as to take photographs in accordance with the sequential lighting. When a sufficient amount of light cannot be obtained by merely lighting only one illumination element 41 and the camera 8 cannot generate appropriate image data, a plurality of illumination elements 41 adjacent to the illumination element 41 may be one illumination element unit. At this time, a calibration is performed by installing a reference object called a target plate for calibration at the inspection position.

The control device 100 extracts luminance values from each of the plurality of pixels included in the plurality pieces of image data obtained according to the sequential lighting. The control device 100 specifies a pixel that shows the highest luminance value among the plurality of pixels in the image data. The pixel corresponds to the camera coordinate system. In addition, the illumination element 41 corresponds to the illumination coordinate system. The control device 100 associates the coordinate of the pixel in the camera coordinate system with the coordinate of the illumination element 41 in the illumination coordinate system. By performing the same process on all the obtained image data, the control device 100 can obtain the correspondence relationship between the camera coordinate system and the illumination coordinate system. The calibration parameters may be calculated by linearly approximating the correspondence relationship between the camera coordinate system and the illumination coordinate system.

When the optical system of the camera 8 used for inspection is a telecentric lens, since the line of sight of the camera is parallel to the optical axis of the camera at any position on the workpiece W, the material of the reference object may be different from the material of the workpiece to be inspected. On the other hand, when the optical system of the camera 8 used for inspection is an ordinary lens other than a telecentric lens, since the line of sight of the camera is changed depending on the position on the workpiece W, it is preferable to select the same material for the reference object and the workpiece to be inspected.

Figure 11:
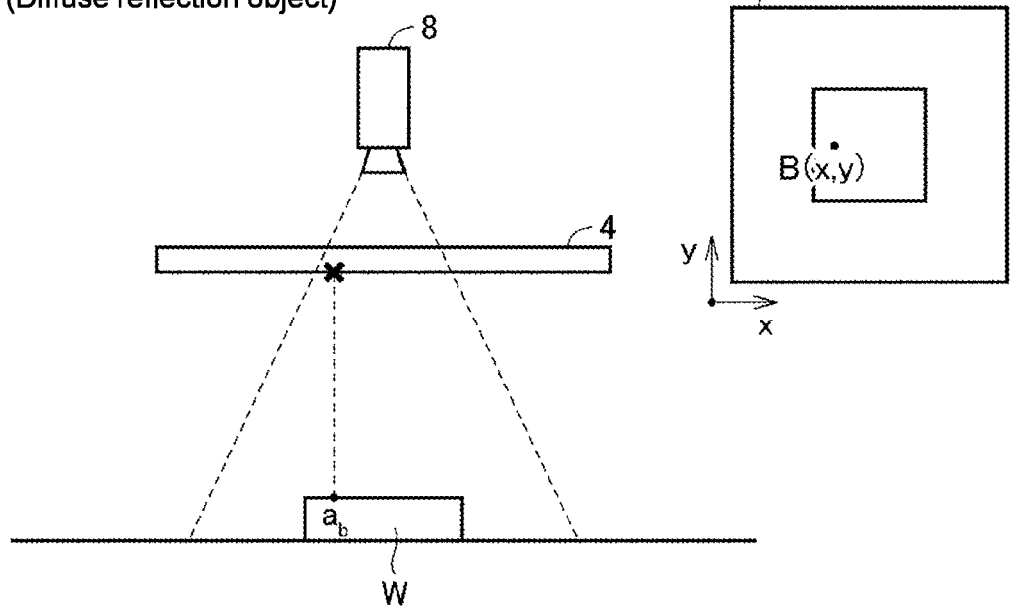
FIG. 11 is a diagram illustrating an example of a calibration result.
Figure 11:
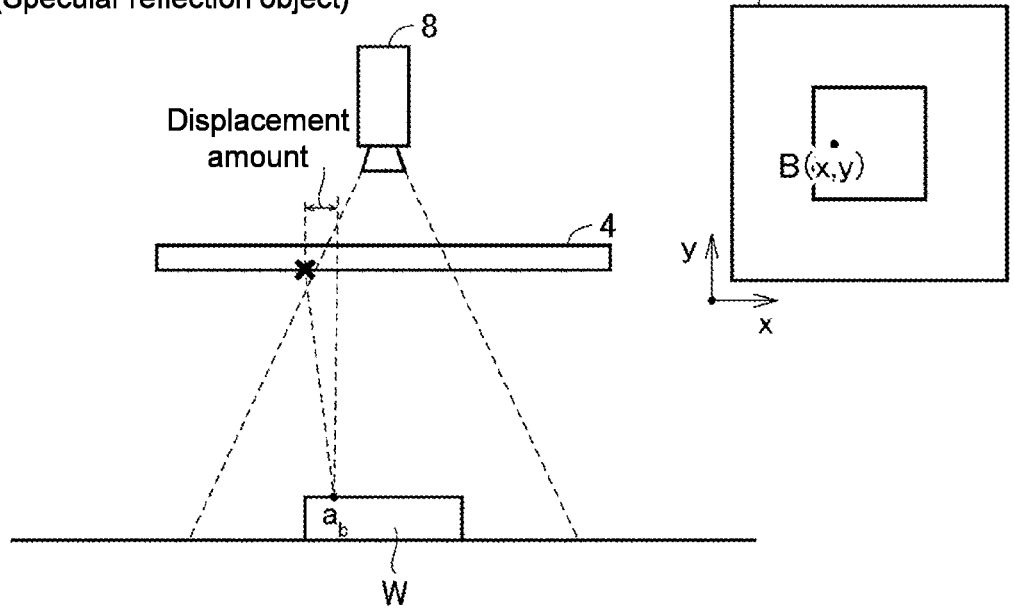

FIG. 11 is a diagram illustrating an example of a calibration result. In the example shown in FIG. 11, the calibration is performed on the camera 8 having a lens other than the telecentric lens. When the reference object is a diffuse reflection object, the position of the illumination element corresponding to the target position $a_b$ located at the position B(x, y) in the camera coordinate system is located approximately directly above the target position $a_b$.

On the other hand, when the reference object is a specular reflection object, the position of the illumination element corresponding to the target position $a_b$ located at the position B(x, y) in the camera coordinate system is displaced from the place directly above the target position $a_b$. The amount of this displacement increases as the position becomes more distant from the optical axis of the camera.

In the camera 8 having a lens other than the telecentric lens, depending on the positional relationship between the camera 8 and a target point on a surface of the workpiece, the line of sight of the camera does not become parallel to the optical axis of the camera. Further, in terms of the specular reflection object, the reflection angle of light reflected on a plane including the target position $a_b$ and the incident angle of light incident on the plane including the target position $a_b$ are substantially equal. Therefore, the position of the illumination element is determined so that the angle formed by the intersection of the line of sight of the camera at the target position $a_b$ and the normal line at the target position $a_b$ is the same as the angle of the reflected light of the light emitted from the position of the illumination element corresponding to the target position $a_b$ located at the position B(x, y) in the camera coordinate system. As a result, the position of the illumination element corresponding to the target position $a_b$ is displaced from the place directly above the target position $a_b$.

Figure 12:
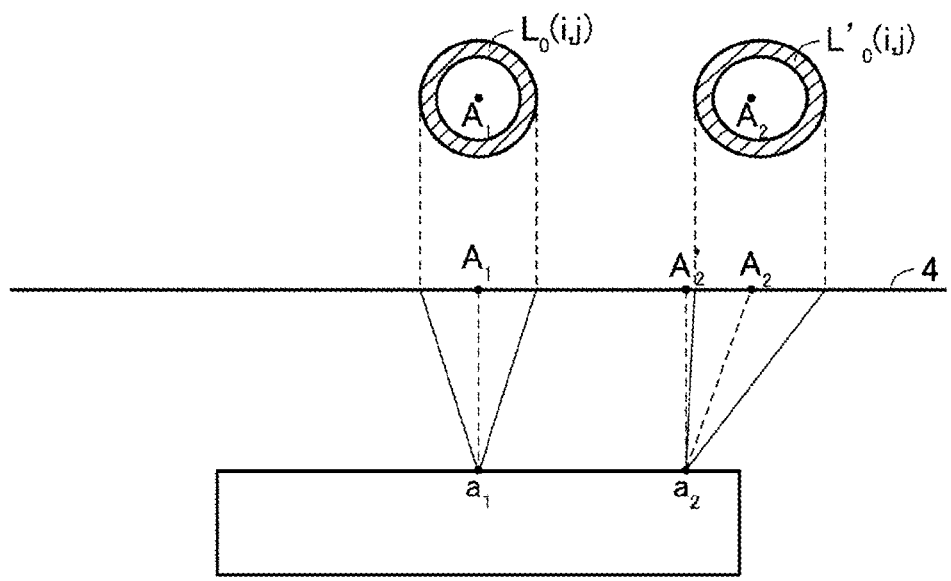
FIG. 12 is a diagram illustrating correction of an illumination pattern.

When the position of the illumination element corresponding to the target position $a_b$ is displaced from the place directly above the target position $a_b$, to illuminate with an illumination pattern different from the illumination pattern in which light is emitted from directly above the target position $a_b$, the reference illumination pattern $L_0$ may be corrected. FIG. 12 is a diagram illustrating correction of an illumination pattern. The position of the illumination element corresponding to the target position $a_1$ is set as a position $A_1$, and the position of the illumination element corresponding to the target position $a_2$ is set as a position $A_2$. The position $A_1$ is located substantially directly above the target position $a_1$. The position $A_2$ is displaced from a position $A'_2$ substantially directly above the target position $a_2$.

Further, like the positional relationship between the position $A_1$ and the target position $a_1$, the shape of the illumination pattern defined with the position A as the origin when the position A is substantially directly above the target position a (in the vertical direction of the light emitting surface 40) is set as the reference illumination pattern $L_0$.

In this case, when the workpiece is illuminated with an illumination pattern for which the reference illumination pattern $L_0$ is formed with the position $A_2$ as the center, the illumination angle of the light incident on the target position $a_2$ is different from the illumination angle of the light incident on the target position $a_1$ when the workpiece is illuminated with an illumination pattern for which the reference illumination pattern $L_0$ is formed with the position $A_1$ as the center.

Therefore, by correcting the reference illumination pattern $L_0$ to be the reference illumination pattern $L'_0$ according to the positional relationship between the position A of the illumination element and the target position a, the illumination condition for each target position can be the same.

Specifically, the reference illumination pattern $L_0$ is corrected according to the positional relationship between the position A of the illumination element and the target position a so that, with the straight line connecting the position A and the target position a as the center, a pattern of light incident on the target position a is equal at each target position. In addition, the intensity of the light emitted from the illumination device 4 may also be corrected so that the intensity of the light incident on the target position $a_1$ when the target position $a_1$ is illuminated with the reference illumination pattern $L_0$ is substantially equal to the intensity of the light incident on the target position $a_2$ when the target position $a_2$ is illuminated with the reference illumination pattern $L'_0$.

Although the shape of the workpiece W is exemplified as a rectangular parallelepiped, the shape of the workpiece W is not limited thereto. For example, the workpiece W may have a flat portion and a tapered portion. For example, when the calibration is performed, the workpiece to be inspected may be used as the reference object.

Figure 13:
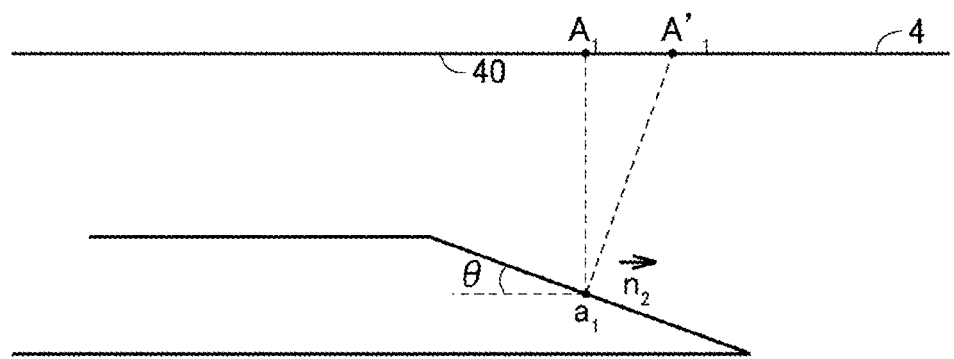
FIG. 13 is a diagram illustrating another correction method of an illumination pattern.

In addition, when the workpiece is not used as the reference object, the position of the illumination element may be corrected based on the shape of the workpiece. FIG. 13 is a diagram illustrating another correction method of an illumination pattern. For example, in the example shown in FIG. 13, when calibration is performed, a reference object with a flat shape is used, and the position of the illumination element corresponding to the target position $a_1$ is the position $A_1$. When the plane including the target position $a_1$ corresponding to the target position $a_1$ on the workpiece W to be inspected is not parallel to the light emitting surface 40, the position of the illumination element may be corrected according to the inclination θ of the plane and the distance between the target position $a_1$ and the illumination device 4, and the position of the illumination element may be set as the position A'1.

K. A Modified Example

[A. An Illumination Pattern]

In the present embodiment, it is exemplified with the reference illumination pattern $L_0$ in which the light among light incident on each target position a has a common wavelength regardless of the incident angle θ. The illumination pattern of light to be emitted to each target position a is not limited to the above, and any illumination pattern may be used.

Figure 14:
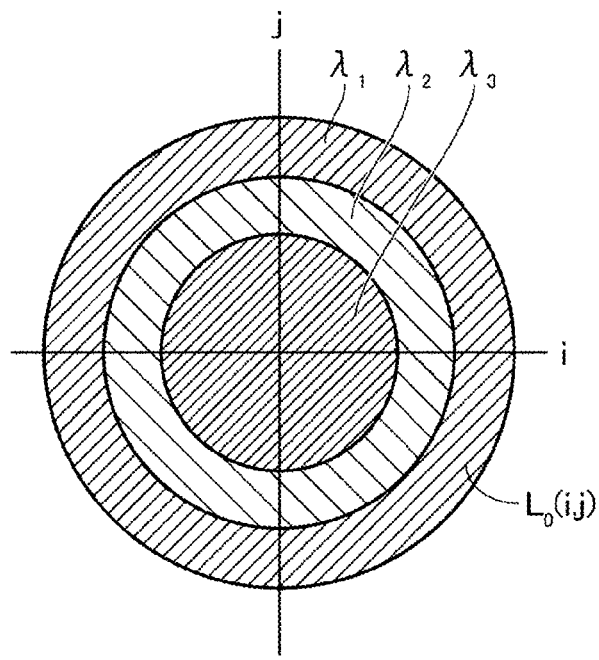
FIG. 14 is a diagram showing a first modified example of a reference illumination pattern.

FIG. 14 is a diagram showing a first modified example of the reference illumination pattern $L_0$. For example, the reference illumination pattern may be a pattern in which light emitted with the origin of a function $L_0(i, j)$ as the center has a wavelength that changes concentrically, wherein the function $L_0(i, j)$ indicates the shape of the reference illumination pattern $L_0$.

By illuminating the workpiece W with the reference illumination pattern $L_0$ shown in FIG. 14, colors of the emitted light can be changed according to the distance from the reference position of the workpiece W corresponding to the target position a; that is, inspection called a color highlight method can be performed. The color of light is defined by the wavelength of light or the wavelength distribution of light. The color of the emitted light may be changed by changing the wavelength of the emitted light or the wavelength distribution of the light.

The color highlight method is a method of detecting the three-dimensional shape of the workpiece W as two-dimensional hue information by emitting lights of different colors at incident angles different from one another and photographing reflected light of each color with the camera 8.

In other words, by changing the colors of the emitted light according to the distance from the reference position of the workpiece W corresponding to the target position a, the three-dimensional shape of the area illuminated with light can be detected as two-dimensional hue information.

Figure 15:
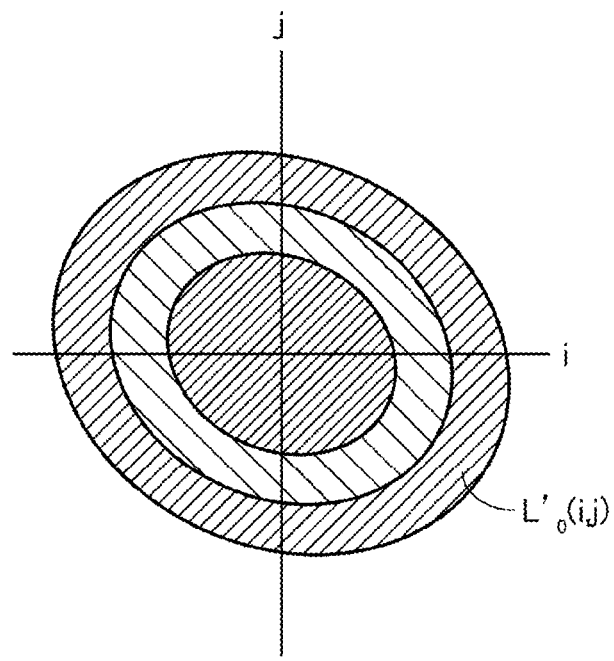
FIG. 15 is a diagram showing an illumination pattern obtained by correcting the reference illumination pattern of the first modified example.

In addition, even when the reference illumination pattern $L_0$ shown in FIG. 14 is used, the reference illumination pattern $L_0$ may be corrected to the illumination pattern $L'_0$ as shown in FIG. 15 according to the positional relationship between the target position a and the position A of the illumination element corresponding to the target position a. FIG. 15 is a diagram showing an illumination pattern obtained by correcting the reference illumination pattern of the first modified example.

Further, light may be emitted from different illumination directions towards each target position a, and a plurality pieces of image data for each target position a may be obtained. In this way, the three-dimensional shape of the area including the target position a may be measured according to the so-called illuminance difference stereo method.

Figure 16:
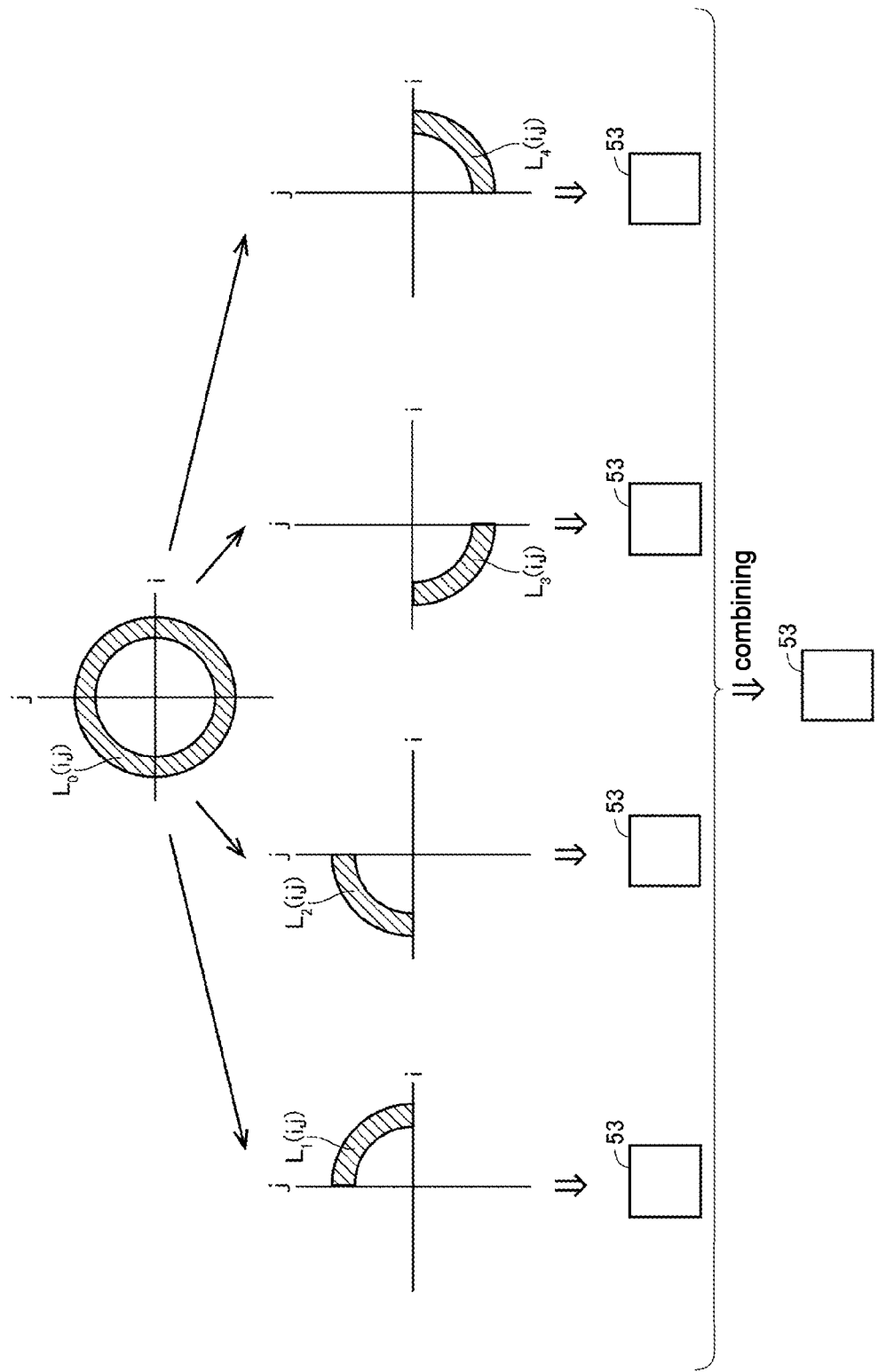
FIG. 16 is a diagram showing a second modified example of a reference illumination pattern.

FIG. 16 is a diagram showing a second modified example of the reference illumination pattern $L_0$. For example, one reference illumination pattern $L_0$ may be broken down into a plurality of reference illumination patterns $L_1$ to $L_4$ so that the illumination directions are different, and the partial image data 53 corresponding to the target position a may be obtained under each of the reference illumination patterns $L_1$ to $L_4$. One piece of the partial image data 53 may be generated by combining the obtained plurality pieces of partial image data 53.

[b. Illumination Patterns According to the Types of the Workpiece]

In the present embodiment, it is exemplified that the stage 300 transports only the same type of workpieces W. For example, a plurality of workpieces W may be sequentially transported by the stage 300.

Figure 17:
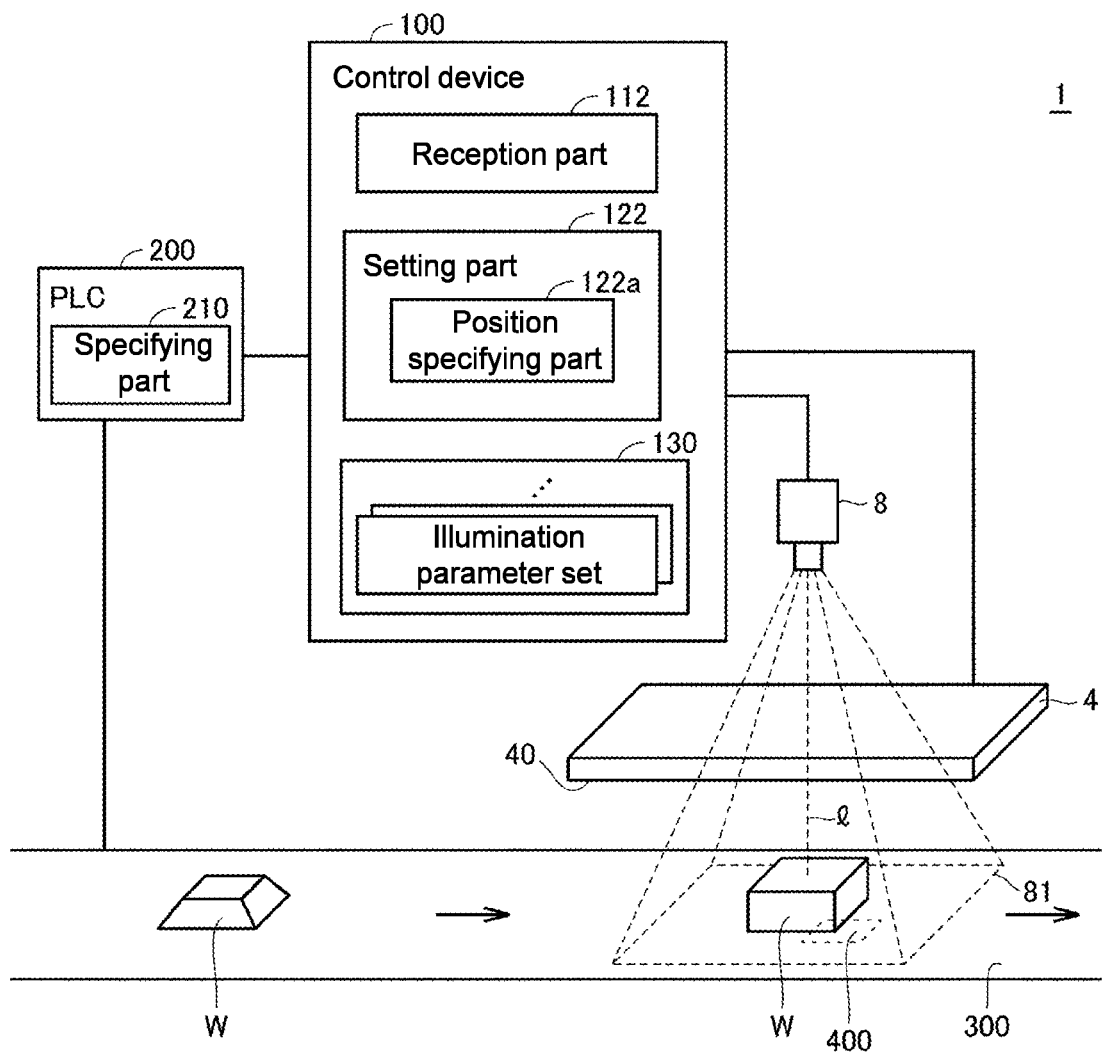
FIG. 17 is a schematic diagram showing an example of an image processing system in a modified example.

In this case, the control device 100 may set the illumination pattern according to the type of the workpieces W and photograph the workpieces W under the set illumination pattern. FIG. 17 is a schematic diagram showing an example of the image processing system 1 in a modified example. The control device 100 according to the present embodiment may store an illumination parameter set that is set for each type (kind) of workpiece in the hard disk 130 which is an example of the storage part. The illumination parameter set is an illumination condition and includes, for example, a reference illumination pattern $L_0$ according to an inspection content and/or the type of the workpiece, a line perpendicular to a small plane including the target positions a provided for each target position a, and calibration parameters.

According to the input of information about the type of the object, the setting part 122 selects an illumination parameter set corresponding to the type of the object that is inputted and sets the illumination condition based on the selected illumination parameter set. The information about the type of the object is identification information for specifying the type of the workpieces W and includes, for example, a product number, a number which is set for each type of product, and the like.

In the example shown in FIG. 17, the information about the type of the object is sent from the PLC 200 and is inputted to a reception part 112 which receives the information about the type of the object. The PLC 200 includes, for example, a specifying part 210 that can specify the type of the workpieces W. The specifying part 210, for example, specifies the type of the workpieces W based on the identification information sent from a reading part 400 that reads the identification information for specifying the type of the workpieces W set for the workpieces W. The reading part 400 is, for example, a reader that reads tags, two-dimensional codes and the like, such as RFID (Radio Frequency Identification).

The control device 100 may have functions of the specifying part 210 that specifies the information about the object. In this case, the information about the type of the object is inputted from the specifying part 210. Further, when the control device 100 includes the specifying part 210, the specifying part 210 may specify the type of the workpieces W based on the identification information sent via the PLC 200. Further, the specifying part 210 may, for example, specify the type of the workpieces W based on the information from the camera 8. Specifically, the specifying part 210 may specify the type of the workpieces W with pattern matching based on the appearance image of the workpieces W, a two-dimensional code provided on the workpieces W, or the like.

In this way, since the control device 100 can set the illumination condition according to the type of the workpieces W, whichever workpiece among the workpieces corresponding to the illumination parameter set stored in the storage part is transported, the inspection can be performed under the illumination condition corresponding to each workpiece. Therefore, a highly versatile image processing system applicable to any workpiece can be provided.

The setting part 122 may further include a position specifying part 122a that specifies the position of the workpiece W. In addition, CAD data of the workpiece W may be included in the illumination parameter set. The position specifying part 122a may cause the camera 8 to photograph the workpiece W to obtain image data and specify the position of the workpiece in the image data from the obtained image data and the CAD data of the workpiece W included in the illumination parameter set.

The setting part 122 can specify the inclination of the workpiece surface at each position in the image data based on the position of the workpiece in the image data and the CAD data. Based on the inclination of the workpiece surface at each position in the image data, the reference illumination pattern $L'_0$ is obtained by correcting the reference illumination pattern $L_0$. As a result, the setting part 122 can set the reference illumination pattern for each position in the image data.

The setting part 122 sets the illumination pattern $L_r$ at each position based on the calibration parameters, the reference illumination pattern that is set for each position, and the coordinate position of each position in the camera coordinate system.

L. Appendix

As described above, the present embodiment includes the following disclosure.

(Configuration 1) An image processing system (1) for performing image measurement of an object (W) using image data (51) obtained by photographing the object, comprising:

a photographing part (8) for photographing the object (W);

a light emitting part (4) which has light transmittance, is disposed between the photographing part (8) and the object (W) and has a light emitting surface (40) widening in a direction different from an optical axis ($\ell$) directed from the photographing part (8) to the object (W); and a control part (100) for controlling the photographing part (8) and the light emitting part (4), wherein the control part (100)

causes light of a first illumination pattern ($L_1$) to be emitted from the light emitting part (4) to the object (W) and obtains first image data (52-1, 53-1) by causing the photographing part (8) to photograph the object (W), and causes light of a second illumination pattern ($L_2$) different from the first illumination pattern ($L_1$) to be emitted from the light emitting part (4) to the object (W) and obtains second image data (52-2, 53-2) by causing the photographing part (8) to photograph the object (W).

(Configuration 2) The image processing system according to Configuration 1, wherein the control part (100) uses a plurality pieces of image data including at least the first image data (52-1, 53-1) and the second image data (52-2, 53-2) to perform an image measurement process with respect to the object (W) (20), the first image data (52-1, 53-1) is associated with a first target position ($a_1$) in a photography visual field (81) of the photographing part (8), the second image data (52-2, 53-2) is associated with a second target position ($a_2$) in the photography visual field (81), the first illumination pattern ($L_1$) is determined according to the first target position ($a_1$), and the second illumination pattern ($L_2$) is determined according to the second target position ($a_2$).

(Configuration 3) The image processing system according to Configuration 2, wherein the first illumination pattern and the second illumination pattern are determined (122) so that an incident direction ($\theta$) of light emitted from the light emitting part (4) to the first target position ($a_1$) is substantially the same as an incident direction ($\theta$) of light emitted from the light emitting part (4) to the second target position ($a_2$).

(Configuration 4) The image processing system according to Configuration 2 or Configuration 3, wherein the control part (100) sequentially changes illumination patterns of light emitted from the light emitting part (4) to the object (W) and causes the photographing part to sequentially photograph the object corresponding to sequential changes of the illumination patterns (124).

(Configuration 5) The image processing system according to any one of Configurations 2 to 4, wherein the photographing part includes a readout circuit (84) that reads out the image signal from a part of a plurality of light receiving elements (83) which convert light included in the photography visual field (81) into an image signal, and wherein the control part (100)

exposes at least a first light receiving element (83-1) corresponding to the first target position ($a_1$) among the plurality of light receiving elements (83) included in the photographing part (8) when the light of the first illumination pattern ($L_1$) is emitted from the light emitting part (4) and subsequently reads out a signal from at least the first light receiving element (83-1) among the plurality of light receiving elements (16), and exposes at least a second light receiving element (83-2) corresponding to the second target position ($a_2$) among the plurality of light receiving elements (83) when the light of the second illumination pattern ($L_2$) is emitted from the light emitting part (4) and subsequently reads out a signal from at least the second light receiving element (83-2) among the plurality of light receiving elements (16).

(Configuration 6) The image processing system according to Configuration 5, wherein at least a part of a process of reading out an image signal from the first light receiving element (83-1) and at least a part of a process of exposing the second light receiving element (83-2) when the light of the second illumination pattern is emitted from the light emitting part are performed at the same time.

(Configuration 7) The image processing system according to any one of Configurations 2 to 6, wherein the first image data (53-1) includes one pixel corresponding to the first target position and one or a plurality of pixels adjacent to the one pixel, and the second image data (53-2) includes one pixel corresponding to the second target position and one or a plurality of pixels adjacent to the one pixel.

(Configuration 8) The image processing system according to Configuration 7, wherein at least a part of pixels among the plurality of pixels included in the first image data (53-1) and the plurality of pixels included in the second image data (53-2) are common, and the control part (100, 18, 20) outputs an image measurement result at a position of the photographing part corresponding to the common pixels based on the first image data and the second image data.

(Configuration 9) The image processing system according to any one of Configurations 2 to 8, wherein when an illumination pattern corresponding to each target position is emitted, the control part changes colors of emitted light according to a distance from a reference position corresponding to the target position on the light emitting surface of the light emitting part.

(Configuration 10) The image processing system according to Configuration 1, wherein:

illumination conditions which include the illumination patterns are determined according to types of objects, and the image processing system further comprises:

a storage part (130) for storing the plurality of illumination conditions set according to the types of the objects; and a setting part (122) which, according to input of information about the types of the objects, sets the illumination conditions corresponding to the types of the objects.

What is claimed is:

1. An image processing system for performing image measurement of an object using image data obtained by photographing the object, comprising:
    a camera for photographing the object;
    a illumination device which has light transmittance, is disposed between the camera and the object and has a light emitting surface widening in a direction different from an optical axis directed from the camera to the object; and
    a control device for controlling the camera and the illumination device,
    wherein the control device
    causes light of a first illumination pattern to be emitted from the illumination device to the object and obtains first image data by causing the camera to photograph the object,
    causes light of a second illumination pattern different from the first illumination pattern to be emitted from the illumination device to the object and obtains second image data by causing the camera to photograph the object, and
    uses a plurality pieces of image data including at least the first image data and the second image data to perform an image measurement process with respect to the object,
    wherein the first image data is associated with a first target position in a photography visual field of the camera,
    the second image data is associated with a second target position in the photography visual field,
    the first illumination pattern is determined according to the first target position, and
    the second illumination pattern is determined according to the second target position,
    wherein the first illumination pattern and the second illumination pattern are determined so that an incident direction of light emitted from the illumination device to the first target position is substantially the same as an incident direction of light emitted from the illumination device to the second target position.

2. The image processing system according to claim 1, wherein the control device sequentially changes illumination patterns of light emitted from the illumination device to the object and causes the camera to sequentially photograph the object corresponding to sequential changes of the illumination patterns.

3. The image processing system according to claim 1, wherein the camera includes a readout circuit that reads out an image signal from a part of a plurality of light receiving elements which convert light included in the photography visual field into the image signal, and
    wherein the control device
    exposes at least a first light receiving element corresponding to the first target position among the plurality of light receiving elements included in the camera when the light of the first illumination pattern is emitted from the illumination device and subsequently reads out the image signal from at least the first light receiving element among the plurality of light receiving elements, and
    exposes at least a second light receiving element corresponding to the second target position among the plurality of light receiving elements when the light of the second illumination pattern is emitted from the illumination device and subsequently reads out the image signal from at least the second light receiving element among the plurality of light receiving elements.

4. The image processing system according to claim 3, wherein at least a part of a process of reading out an image signal from the first light receiving element and at least a part of a process of exposing the second light receiving element when the light of the second illumination pattern is emitted from the illumination device are performed at the same time.

5. The image processing system according to claim 1, wherein the first image data includes one pixel corresponding to the first target position and one or a plurality of pixels adjacent to the one pixel included in the first image data, and
    the second image data includes one pixel corresponding to the second target position and one or a plurality of pixels adjacent to the one pixel included in the second image data.

6. The image processing system according to claim 5, wherein at least a part of pixels among the plurality of pixels included in the first image data and the plurality of pixels included in the second image data are common, and
    the control device outputs an image measurement result at a position of the camera corresponding to the common pixels based on the first image data and the second image data.

7. The image processing system according to claim 1, wherein when an illumination pattern corresponding to each target position is emitted, the control device changes colors of emitted light according to a distance from a reference position corresponding to the target position on the light emitting surface of the illumination device.

8. An image processing system for performing image measurement of an object using image data obtained by photographing the object, comprising:
    a camera for photographing the object;
    a illumination device which has light transmittance, is disposed between the camera and the object and has a light emitting surface widening in a direction different from an optical axis directed from the camera to the object; and
    a control device for controlling the camera and the illumination device,
    wherein the control device
    causes light of a first illumination pattern to be emitted from the illumination device to the object and obtains first image data by causing the camera to photograph the object, and causes light of a second illumination pattern different from the first illumination pattern to be emitted from the illumination device to the object and obtains second image data by causing the camera to photograph the object, wherein:

a plurality of illumination conditions which include the first and second illumination patterns are determined according to types of objects, and the image processing system further comprises:
- a storage device for storing the plurality of illumination conditions set according to the types of the objects; and
- a setting part which, according to input of information about the types of the objects, sets the plurality of illumination conditions corresponding to the types of the objects.

* * * * *